United States Patent [19]
Nishihara et al.

[11] Patent Number: 5,682,215
[45] Date of Patent: Oct. 28, 1997

[54] COLOR DISPLAY DEVICE WITH LIGHT INCIDENT SUBSTRATE HAVING COLOR FILTERS ON THE OUTSIDE AND MICROLENSES ON THE INSIDE SURFACE

[75] Inventors: Shizuo Nishihara; Toshihiro Fukuda; Satofumi Koike; Shunji Kurita, all of Kanagawa; Shin Yoshizawa, Tokyo; Tetsuro Ochi, Kanagawa, all of Japan

[73] Assignee: Sony Corporation, Japan

[21] Appl. No.: 569,295

[22] Filed: Dec. 8, 1995

[30] Foreign Application Priority Data

Dec. 22, 1994 [JP] Japan .................. 6-335891

[51] Int. Cl.$^6$ .................................. G02F 1/1335
[52] U.S. Cl. ........................... 349/95; 349/106
[58] Field of Search ........................ 349/106, 95

[56] References Cited

U.S. PATENT DOCUMENTS

| | | | |
|---|---|---|---|
| 4,560,241 | 12/1985 | Stolov et al. | 359/68 |
| 4,690,511 | 9/1987 | Watanabe | 349/106 |
| 4,743,099 | 5/1988 | Dickerson et al. | 359/68 |
| 4,877,697 | 10/1989 | Vollmann et al. | 349/106 |
| 5,381,187 | 1/1995 | Takamatsu et al. | 348/759 |
| 5,459,592 | 10/1995 | Shibatani et al. | 349/95 |
| 5,466,926 | 11/1995 | Sasano et al. | 359/316 |

FOREIGN PATENT DOCUMENTS

| | | | |
|---|---|---|---|
| 62-267723 | 11/1987 | Japan | 359/68 |
| 6-148627 | 5/1994 | Japan | 359/40 |
| 6-175120 | 6/1994 | Japan | 359/68 |
| 6-265870 | 9/1994 | Japan | 359/68 |

OTHER PUBLICATIONS

Patent Abstracts of Japan, vol. 18, No. 642 (Dec. 6, 1994) for JP 6-250170 (Sep. 9, 1994).

Patent Abstracts of Japan, vol. 18, No. 7 (Jan. 7, 1994) for JP 5-249318 (Sep. 28, 1993).

Patent Abstracts of Japan, vol. 17, No. 54 (Feb. 3, 1993) for JP 4-265905 (Sep. 22, 1992).

Patent Abstracts of Japan, vol. 18, No. 510 (Sep. 26, 1994) for JP 6-175120 (Jun. 24, 1994).

*Primary Examiner*—Anita Pellman Gross
*Attorney, Agent, or Firm*—Ronald P. Kananen

[57] ABSTRACT

There is provided a color display device comprising a first substrate provided on the light source side to accept an incident light, a second substrate joined with the first substrate via a space to emit an outgoing light, an electro-optical substance held in the space, a plurality of picture elements arranged in a matrix on the second substrate to modulate an incident light and emit an outgoing light, a plurality of microlenses, arranged on the incident light side of the picture elements, for condensing incident light to individual picture elements and a color filter, arranged on the incident light side of the microlenses, for coloring individual picture elements.

3 Claims, 4 Drawing Sheets

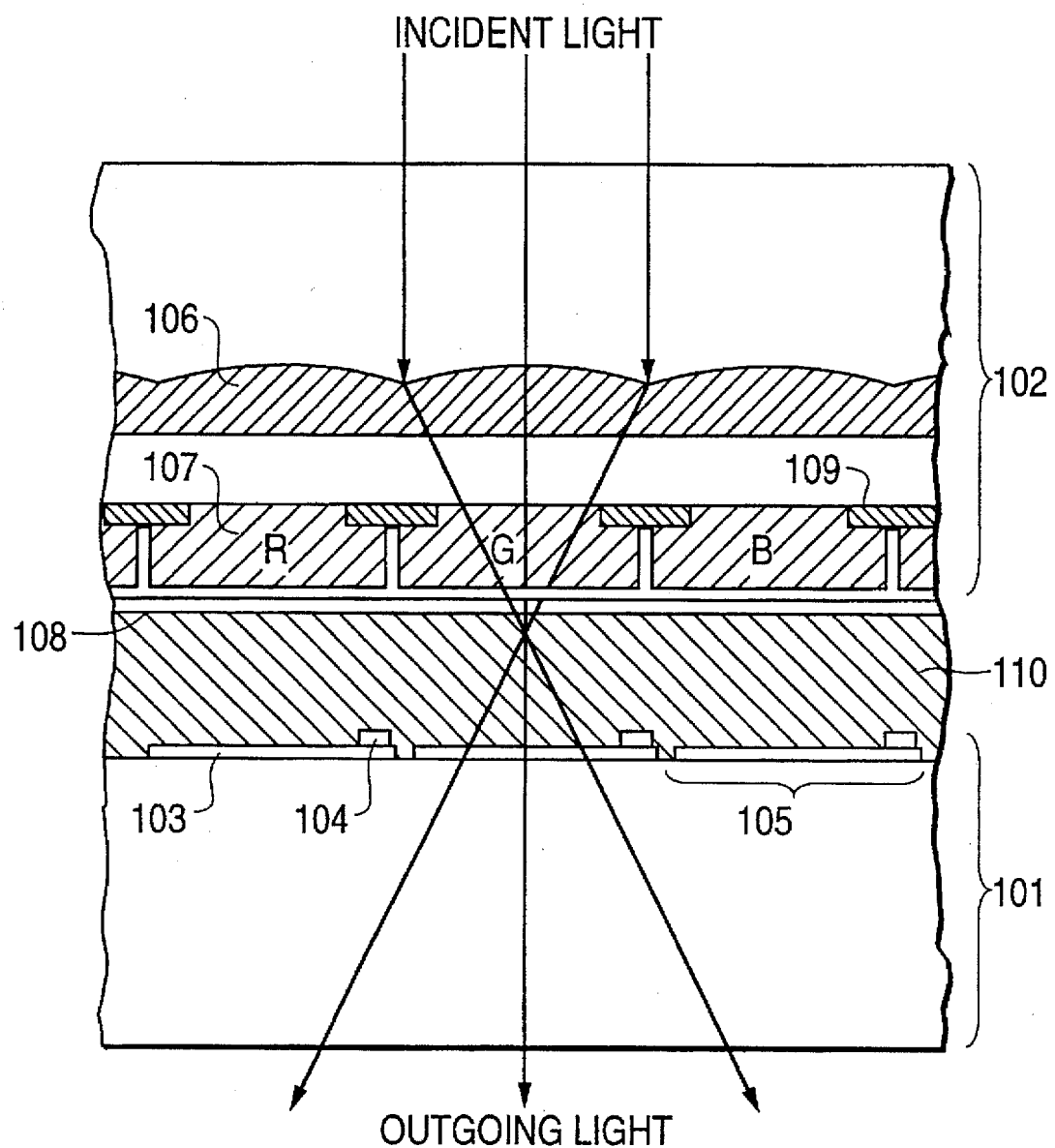

COLOR DISPLAY DEVICE WITH LIGHT INCIDENT SUBSTRATE HAVING COLOR FILTERS ON THE OUTSIDE AND MICROLENSES ON THE INSIDE SURFACE

BACKGROUND OF THE INVENTION

1. Field of the Invention

The present invention relates to a transmissive type color display device having microlenses for condensing an incident light to each picture element.

2. Description of Related Art

A projector having comprised a liquid crystal panel as a color display device is designed light weight and compact to realize display on a large size display screen. In the case of this projector, an incident light irradiates the rear side of the liquid crystal panel and color images are projected on a screen provided at the front side. The liquid crystal projector is classified into a three-plate system and a single-plate system. In the three-plate system, a white light is decomposed to primaries of red, green and blue and images formed by three sheets of the liquid crystal panels corresponding to three colors are superimposed. Meanwhile, in the single plate system, a color image is projected by providing color filters of red, green and blue within a sheet of liquid crystal panel. Therefore, reduction in size and weight and low cost of the liquid crystal projector may be realized by employing the single plate system.

However, in order to obtain the resolution in the same degree as that of the three-plate system in the single plate system, the number of picture elements to be formed on one liquid crystal panel must be three times the number of picture elements of each liquid crystal panel used in the three-plate system. Therefore, each picture element must be formed in an ultra-fine element size to increase the number of picture elements. When an picture element electrode exceeds a certain size, it becomes difficult to reduce, in proportion thereto, the size of a switching element, such as TFT, provided corresponding to each picture element and width of wiring electrode. Therefore, an aperture ratio (a ratio of occupation of a total area of picture element electrodes for the entire part of the display screen) is lowered in the liquid crystal panel 1 having ultra-fine picture element electrodes. When a liquid crystal panel having a lower aperture ratio, the projected display screen becomes dark even when a light source of the same brightness is used.

In order to eliminate such disadvantages, a liquid crystal panel providing a microlens array has been developed and is disclosed, for example, in the Japanese Patent Laid-Open No. HEI 4-50816. As shown in FIG. 4, this liquid crystal panel is provided with an active matrix array substrate 101 and an opposite substrate 102. The active matrix array substrate 101 is provided, in its internal surface side, with picture element electrodes 103 and TFTs (Thin Film Transistors) 104 to form picture elements 105. The opposite substrate 102 is provided with many microlenses 106 corresponding to picture element electrodes 103 in the side of active matrix array substrate 101, a corresponding color filter 107 and an opposite electrode 108. The color filter 107 is colored with red (R), green (G) and blue (B), respectively. Moreover, a black mask 9 is patterned to surround the circumference of the colored areas of the color filter 107 in order to specify the aperture of the corresponding picture element 105. The liquid crystal 110 is held as an electro-optical material between the active matrix array substrate 101 and opposite substrate 102.

Usually, a microlens 106 condenses an incident light and the light effectively irradiates a corresponding picture element 105 via the colored area of a color filter 107. That is, the microlens 106, color filter 107 and picture element 105 are arranged sequentially toward the outgoing side from the incoming side. Generally, the color filter 107 is composed of an organic material in which pigment is dispersed. However, in the constitution of the related art as described above, the light beam is condensed toward the color filter 107 composed of an organic material via the microlens 106, there rises a problem that bleaching of color filter 107 is accelerated. If the color filter 107 is bleached as explained above, an expensive liquid crystal panel as a whole can no longer be used, resulting in a serious defect from the economical viewpoint, although a color filter 107 which is only a part of the liquid crystal panel is deteriorated.

This problem will then be further explained hereunder. As shown in FIG. 4, the microlens 106 is usually located in the incident light side more than the color filter 107. Here, any problem does not occur when the liquid crystal panel is used as a direct-viewing panel. However, if the liquid crystal panel is used as a projection type display, light resistance and thermal resistance of the color filter 107 rise as problems because the incident light condensed by the microlens 106 passes the color filter 107. As shown in the figure, individual microlens 106, color filter 107 and picture element 105 have almost equal size. Therefore, the black mask 109 is formed on the opposite electrode 102 to form an aperture as explained above. If it is assumed here that an area of the color filter 107 exposed from this aperture is one-half the area of the microlens 106. In this case, the incident light from the microlens 106 is condensed to two times in the energy intensity to concentratedly irradiate the central zone of the colored area of the corresponding color filter 107. Therefore, bleaching washout of the color filter 107 is accelerated.

SUMMARY OF THE INVENTION

In order to solve the problems of the related arts, following facilities are provided in the present invention.

According to one aspect of the present invention, a color display device comprises a first substrate provided in the light source side to accept an incident light, a second substrate joined with the first substrate via a space to emit an outgoing light, an electro-optical material held in the space, a plurality of picture elements arranged in a matrix on the second substrate to modulate an incident light and emit an outgoing light, a plurality of microlenses, arranged in the incident light side than the picture elements, for condensing incident light to individual picture element, and a color filter, arranged in the incident light side than the microlenses, for coloring individual picture element.

The color filter may be formed at an external surface side of the first substrate, and the microlens may be formed at the internal surface side of the first substrate.

The color filter may be formed at the internal surface side of the first substrate, and the microlens may be formed at the internal surface side of the first substrate stacking on the color filter.

A picture element electrode forming individual picture element and a switching element associated to the picture element electrode may be provided at the internal surface side of the first substrate.

The opposite electrodes formed opposed to the individual picture element electrodes may be provided at the internal surface side of the second substrate.

According to another aspect of the present invention, a color display device comprises a first substrate located at the light source side to accept an incident light, a second substrate joined with the first substrate via a space to emit an outgoing light, an electro-optical material held in the space, a plurality of picture elements arranged in a matrix on the second substrate to modulate an incident light and emit an outgoing light, and a plurality microlenses for condensing the incident light to individual picture element, each microlens having a function as a color filter aligned with each picture element.

The microlens may be formed of a resin having pigments dispersed therein.

BRIEF DESCRIPTION OF THE DRAWINGS

FIG. 4 is a partial cross-sectional view illustrating an example of a color display device of the related art.

DESCRIPTION OF THE PREFERRED EMBODIMENTS

The preferred embodiments of the present invention will be explained in detail with reference to the accompanying drawings.

Figure 1:
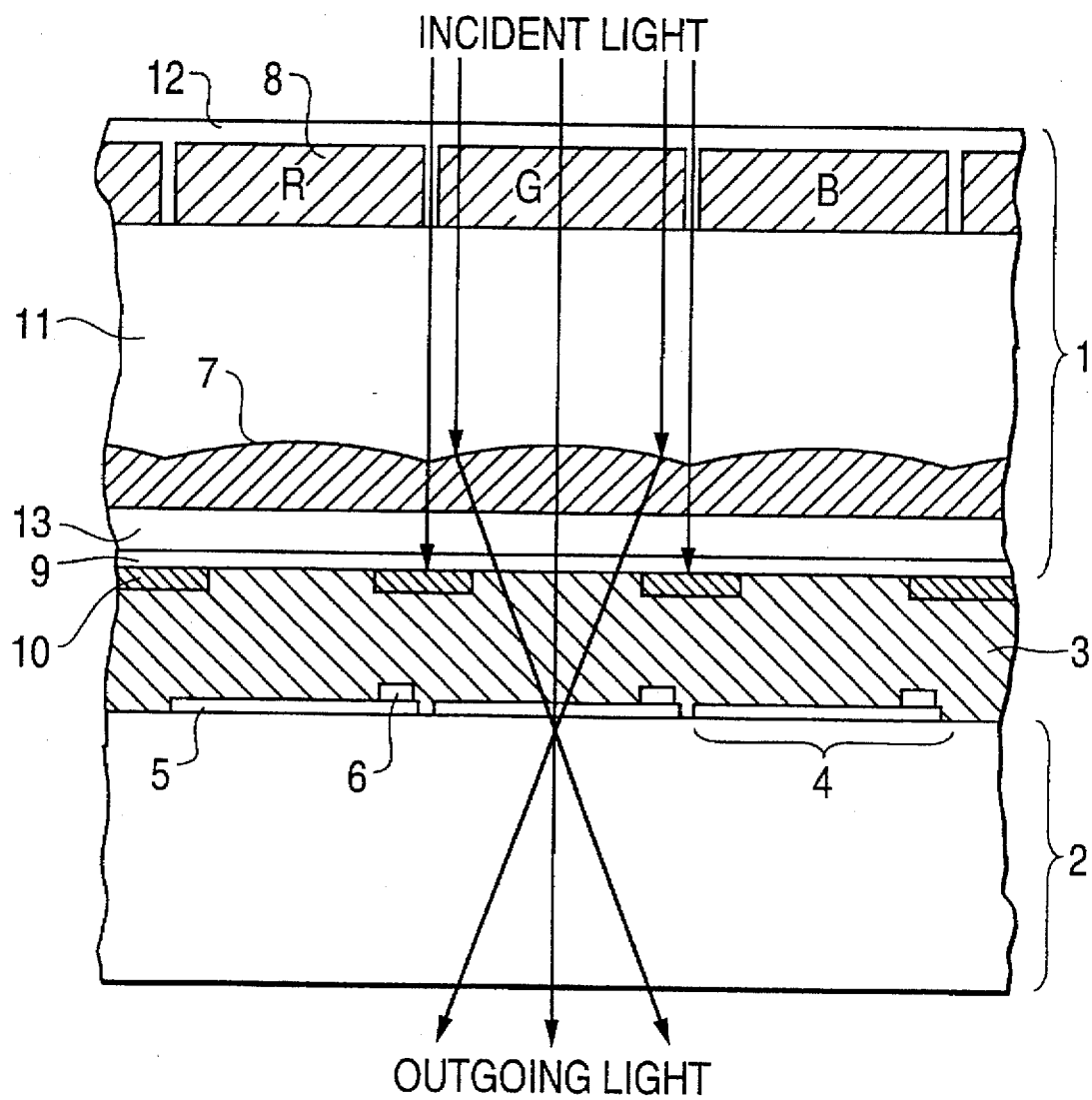
FIG. 1 is a schematic partial cross-sectional view illustrating a first embodiment of a color display device of the present invention.

FIG. 1 is a schematic partial cross-sectional view illustrating a first embodiment of a color display device of the present invention. As shown in this figure, a color display device of the present invention has a flat panel structure comprising an opposite substrate (first substrate) 1 which is located in the light source side to accept an incident light, an active matrix array substrate (second substrate) 2 joined with the opposite substrate 1 via the predetermined space to emit the outgoing light and electro-optical material consisting of liquid crystal 3, etc. held in the space. At the internal surface of the active matrix array substrate 2, numerous number of picture elements 4 arranged in the matrix shape are integrated to modulate and convert electro-optically the incident light to the outgoing light. Individual picture element 4 is composed of a picture element electrode 5 consisting of a transparent conductive film and a switching element consisting of a TFT 6, etc. to drive the picture element electrode.

Meanwhile, in the side of the opposite substrate 1, a microlens 7 for condensing the incident light to each picture element 4 and a color filter 8 for coloring each picture element 4 to each color of the RGB primaries are integrally formed. Here, it should be noted that the color filter 8, microlens 7 and picture element 4 are arranged sequentially toward the outgoing side from the incident side. In this embodiment, the color filter 8 is formed at the external surface side of the opposite substrate 1, while the microlens 7 is formed at the internal surface side of the opposite substrate 1. The incident light first passes the color filter 8 located at the external surface side of the opposite substrate 1. In this stage, since the incident light is not condensed, irradiation energy density to the color filter 8 is comparatively lower, thus lowering the conditions that could accelerate bleaching. After having passed the color filter 8, the incident light is condensed by the microlens 7 to irradiate the picture element 4. The picture element 4 modulates electro-optically the incident light to emit the outgoing light for the desired color image display. At the internal surface side of the opposite substrate 1, an opposite substrate 9 consisting of a transparent conductive film is formed and each picture element 4 is actually constituted by the opposite electrode 9, picture element electrode 5 and liquid crystal 3 held therebetween. Transmissivity of the liquid crystal 3 changes depending on a voltage to be applied across the opposite electrode 9 and picture element electrode 5 for the desired electro-optical modulation. Moreover, a black mask 10 is patterned at the internal surface side of the opposite substrate 1 to define a boundary at the circumference of each picture element 4. This black mask 10 specifies the aperture of each picture element 4.

A color filter 8 and microlens 7 which are principal structural elements of this color display device will also be explained in detail. The color filter 8 is integratedly formed on a glass base material 11 forming an opposite substrate 1. In more practical, a color filter 8 is formed by the pigment dispersing method or printing method. In the pigment dispersing method, a red color filter part is formed by coating the external surface of a glass base material 11 with a photosensitive film to which a red pigment is dispersed previously and then exposing and developing such photosensitive film. In the same manner, a green color filter part is formed by coating the glass base material with the photosensitive film to which a green pigment is dispersed and then exposing and developing the photosensitive film. Moreover, a blue color filter part is formed by coating the glass base material with a photosensitive film to which a blue pigment is dispersed and then exposing and developing the photosensitive film. The color filter 8 for RGB primaries which is integratedly formed as explained above is covered with a transparent protection film 12.

A microlens 7 is formed at the internal surface side of a glass base material 11 by an etching method or ion replacement method. For example, in the case of the etching method, after the surface of the glass base material 11 is covered with resist, fine apertures are dispersely provided. Using the resist as a mask, the glass base material 11 is isotropically etched with hydrofluoric acid, etc. Since etching proceeds isotropically from the center of fine apertures, a concave surface is formed by the etching within each aperture. The concave surface is filled with a transparent material such as epoxy resin, etc. to form the microlens 7. Since a refractive index of the glass base material 11 is different from that of transparent epoxy resin, a microlens 7 can be formed. The microlens 7 having desired focal distance can be obtained by adequately setting the refractive index and radius of curvature of the concave surface. A glass sheet 13 having the predetermined thickness is adhered to the glass base material 11 in order to set the focal distance to the picture element 4. At the surface of this glass sheet 13, the opposite electrode 9 and black mask 10 explained above are formed. The black mask 10 is not always required to be provided in the side of the opposite substrate 1 and it may also be formed, as required, by the patterning in the side of the active matrix array substrate 2.

Meanwhile, in the ion replacement method, Ti is vacuum-deposited on a soda glass plate and a circular window is opened by the photolithography. Thereafter these elements are soaked into the solution where nitric acid salt of univalent ion is dissolved. Here, the solution is heated up to 400° C. or higher. The positive ions in the solution isotropically diffuses into the glass from the aperture window to conduct the ion exchange. Composition within the glass material changes generating distribution of refractive indices.

Therefore, a microlens can work as a lens as in the case of "SELFOC" lens which is used as a connector of optical fiber. In the case of microlens used in the projector, the fine windows are filled, for example, just like a honeycomb.

In a liquid crystal panel, an active matrix type shown in FIG. 1 is excellent in the point of display quality such as contrast ratio and response rate. However, in the active matrix type liquid crystal panel, TFT 6 which shields a light and interconnections such as bus lines must be formed within the display screen and therefore the more the picture element 4 is formed finer, the more the aperture ratio become lower resulting in darker display screen. Therefore, a microlens 7 is arranged corresponding to each picture element 4 as a method of enhancing the application coefficient of the light from the light source. Thereby, the incident light to the shielding region is condensed to the aperture of the picture element 4 and accordingly the aperture ratio is substantially improved, resulting in bright display screen. In the present invention, a microlens 7 is integratedly formed at the internal surface side of the glass base material 11 by the etching method or ion replacement method as shown in FIG. 1. Meanwhile, the color filter 8 is formed at the external surface side of the glass base material 11 by the pigment dispersing method or printing method. Accordingly, the incident light passes through the color filter 8 before it is condensed by the microlens 7. As a result, even when the material of color filter used in the liquid crystal panel not utilizing the microlens is used as a direct-viewing panel, any problem is not generated for light resistance and thermal resistance.

Figure 2:
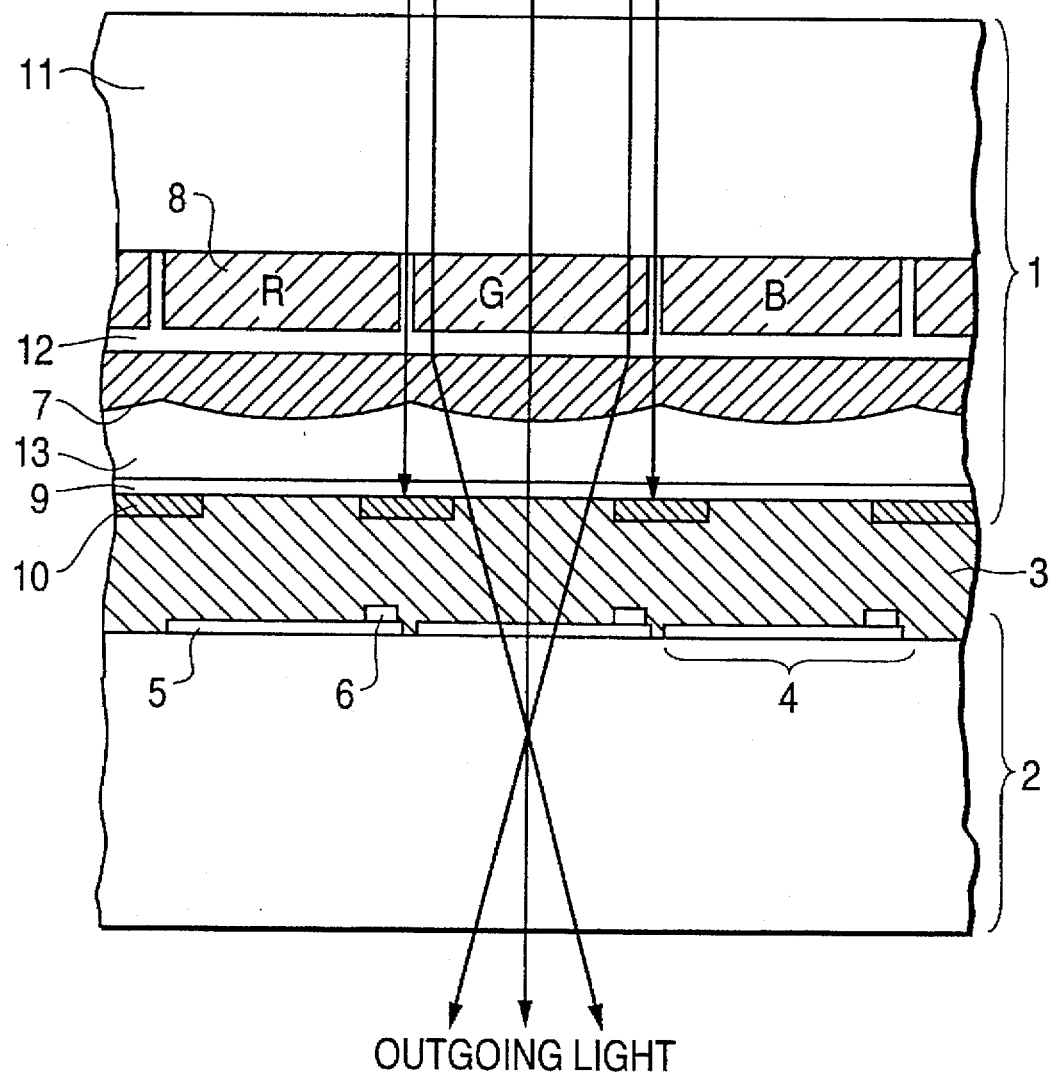
FIG. 2 is a schematic partial cross-sectional view illustrating a second embodiment of a color display device of the present invention.

FIG. 2 is a schematic partial cross-sectional view of a second embodiment of a color display device if the present invention. The basic constitution is similar to the first embodiment shown in FIG. 1 and like elements are designated by the like reference numeral for helping understanding. A difference is that the color filter 8 is formed at the internal surface side of the opposite substrate 1 and the microlens 7 is also formed and stacked at the internal surface side of the color filter 8. This constitution assures less probability in occurrence of damage because the color filter 8 is not exposed at the external surface side, unlike the first embodiment. As a practical method, the color filter 8 is integratedly formed by the pigment dispersing method or printing method, for example, at the internal surface side of the glass base material 11. The surface of the color filter 8 is then covered with a protection film 12. Meanwhile, the microlens 7 is formed by the etching method or ion replacement method at the one surface of the glass sheet 13. Thereafter, under the condition that the color filter 8 and the microlens 7 are provided opposed with each other, the glass base material 11 and glass sheet 13 are adhered to form an integrated opposite substrate 1.

Figure 3:
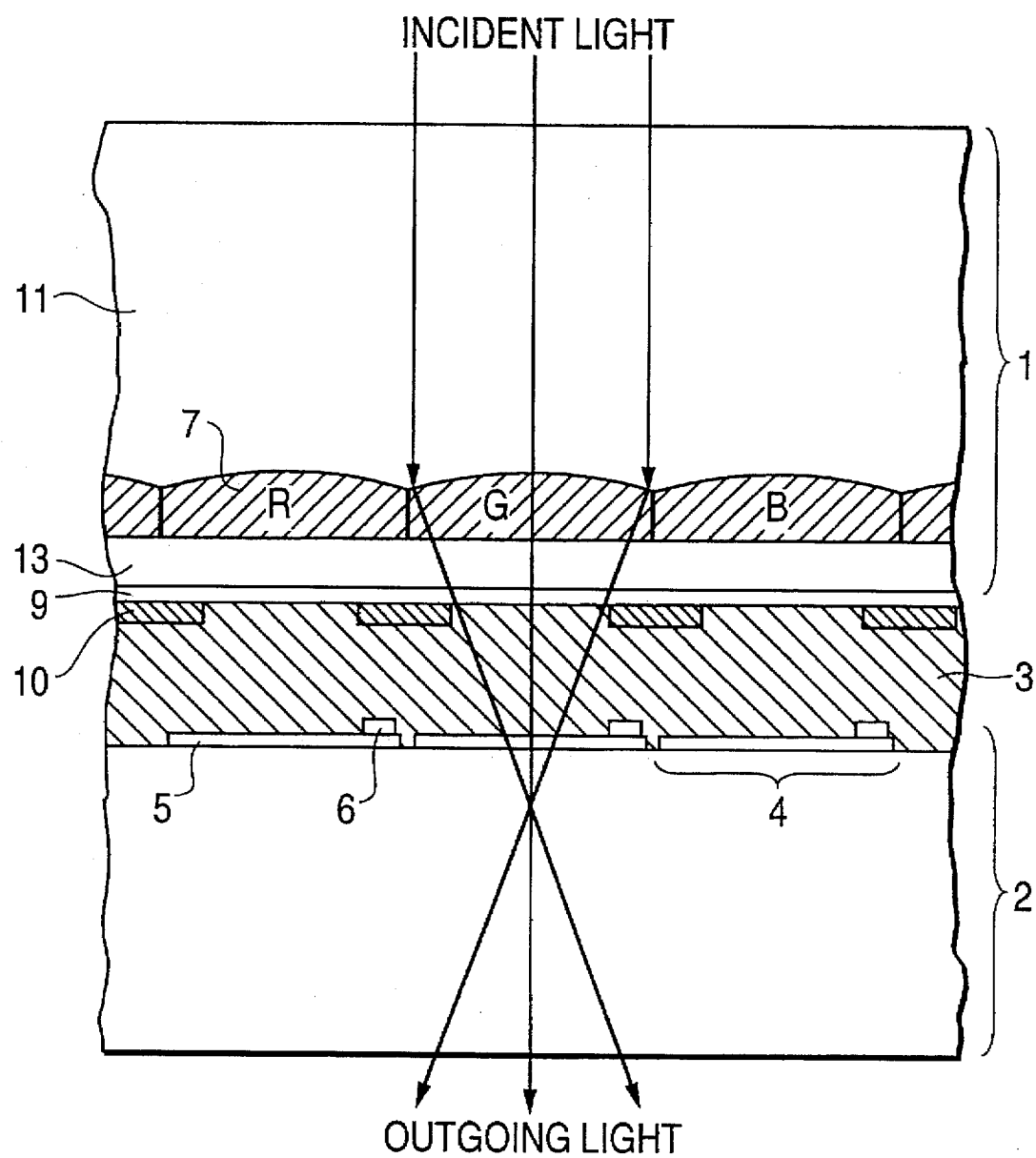
FIG. 3 is a schematic partial cross-sectional view illustrating a third embodiment of a color display device of the present invention.

FIG. 3 is a schematic partial cross-sectional view illustrating a third embodiment of a color display device of the present invention.

For helping understanding, the elements like those in the first embodiment shown in FIG. 1 are denoted by the like reference numerals. The color display device of this embodiment has a flat panel structure comprising an opposite substrate (first substrate) 1 located at the light source side to accept an incident light, an active matrix array substrate (second substrate) 2 joined with the opposite substrate via the predetermined space to emit an outgoing light and an electro-optical material consisting of liquid crystal 3 held between such opposite substrate and active matrix array substrate. This flat panel structure integrally forms numerous number of picture elements 4 which are arranged in the matrix shape to modulate an incident light to emit the outgoing light and numerous number of microlenses 7 for condensing incident light to individual picture element 4. It should be noted that each microlens 7 itself is colored with each color of the RGB primaries and works as a color filter aligned with each picture element 4. In more practical, the microlens 7 itself is given a function as a color filter by selectively mixing the red, green and blue pigments to the epoxy resin which is used as the material of the microlens 7. Since this structure is equivalent to the case where the incident light passes the color filter before the microlens 7 condenses the incident light, a problem that bleaching is accelerated is never generated.

As explained previously, according to the present invention, the color filer, microlens and picture element are sequentially arranged toward the outgoing side from the incident side and moreover the color filter is not irradiated with an incident light having higher energy density to suppress deterioration by bleaching. This structure realizes a high luminance liquid crystal projector because there is no problem in light resistance and thermal resistance even when a material same as that used in the liquid crystal panel not utilizing the microlens is used in the case of comprising the liquid crystal panel integrally forming the microlens and color filter into the projector. Moreover, according to another aspect of the present invention, the manufacturing processes may be simplified in comparison with the case of individually manufacturing the microlens and color filter by giving a function as the color filter to the microlens itself.

What is claimed is:

1. A color display device comprising:

a first substrate provided on a light source side to accept incident light;

a second substrate joined with said first substrate via a space to emit outgoing light;

an electro-optical material held in said space;

a plurality of picture elements arranged in a matrix on said second substrate to modulate incident light and emit outgoing light;

a plurality of microlenses, arranged on an incident light side of said picture elements and formed on the internal surface side of said first substrate, each for condensing incident light to an individual picture element; and a color filter of plural color filter elements, formed at an external surface side of said first substrate on the incident light side of said microlenses, each color filter element for coloring an individual picture element.

2. A color display device according to claim 1, wherein picture element electrodes each forming an individual picture element and switching elements each associated with a picture element electrode are provided at the internal surface side of said second substrate.

3. A color display device according to claim 2, wherein opposite electrodes formed opposed to said picture element electrodes are provided at the internal surface side of said first substrate.

* * * * *